Aug. 7, 1956   L. A. JOHNSON ET AL   2,757,991
JOURNAL LUBRICANT CIRCULATOR
Filed March 11, 1954   4 Sheets-Sheet 1

INVENTORS
LLOYD A. JOHNSON
DAN A. CHRISTENSEN
ANTONE D. MARTIN
BY
ATTORNEYS

Aug. 7, 1956 L. A. JOHNSON ET AL 2,757,991
JOURNAL LUBRICANT CIRCULATOR
Filed March 11, 1954 4 Sheets-Sheet 2
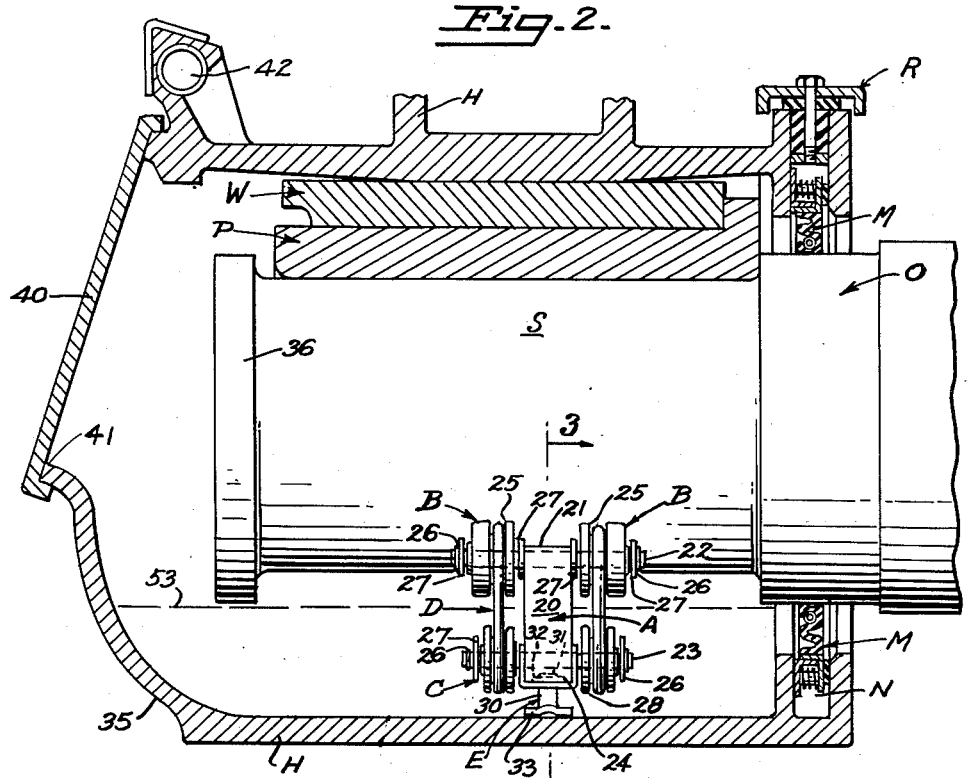
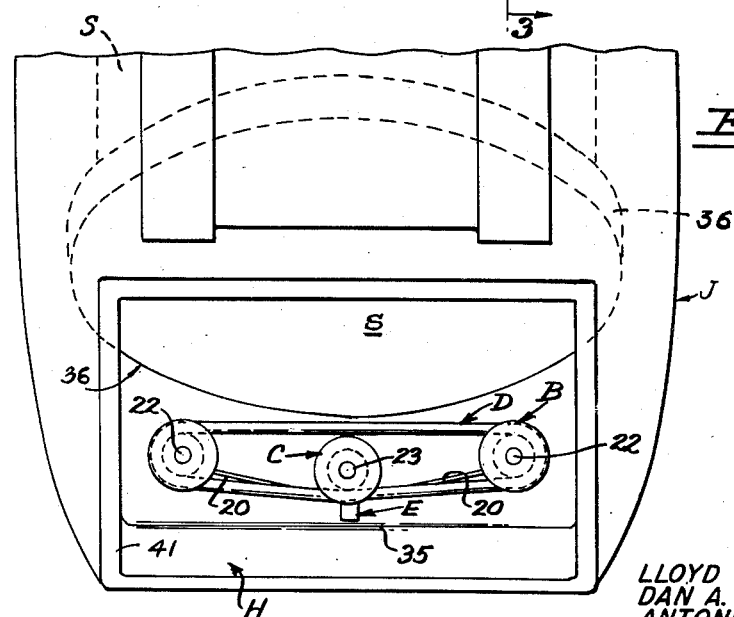
INVENTORS
LLOYD A. JOHNSON
DAN A. CHRISTENSEN
ANTONE D. MARTIN
BY George A. Brace
A. Dunham Owen
ATTORNEYS Aug. 7, 1956 L. A. JOHNSON ET AL 2,757,991
JOURNAL LUBRICANT CIRCULATOR
Filed March 11, 1954 4 Sheets-Sheet 3

INVENTORS
LLOYD A. JOHNSON
DAN A. CHRISTENSEN
ANTONE D. MARTIN
BY
ATTORNEY

Aug. 7, 1956 L. A. JOHNSON ET AL 2,757,991
JOURNAL LUBRICANT CIRCULATOR
Filed March 11, 1954 4 Sheets-Sheet 4
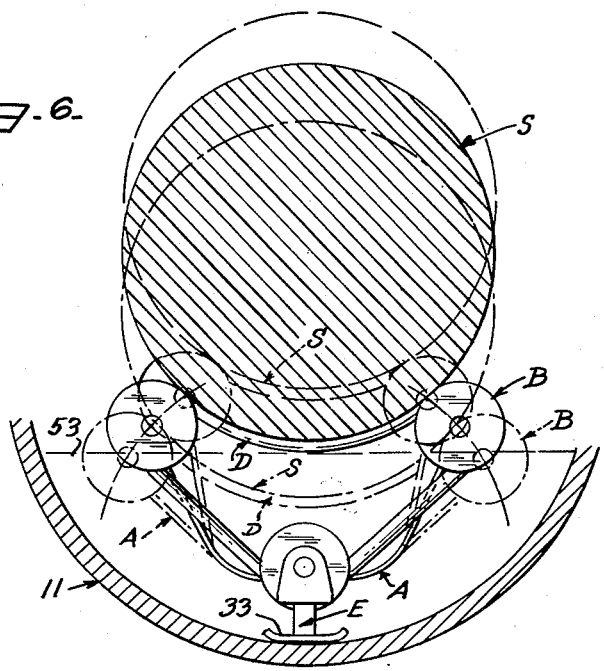
Fig. 6.
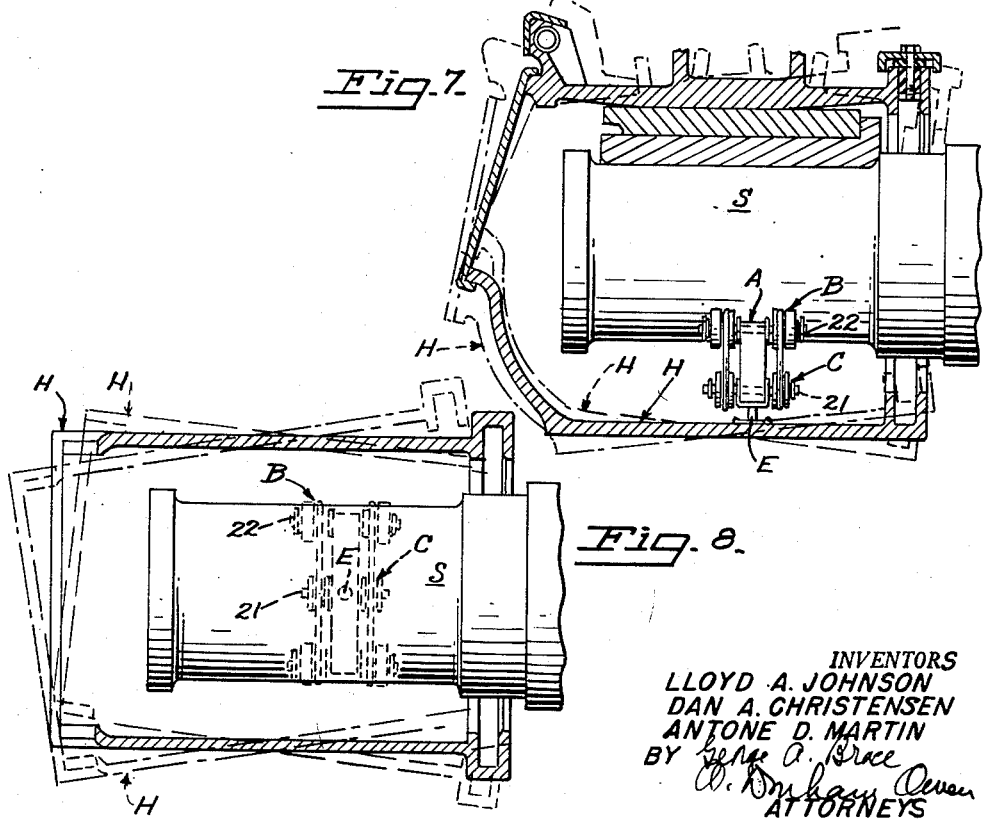
Fig. 7.
Fig. 8.
INVENTORS
LLOYD A. JOHNSON
DAN A. CHRISTENSEN
ANTONE D. MARTIN
BY
ATTORNEYS

United States Patent Office 2,757,991
Patented Aug. 7, 1956

2,757,991
JOURNAL LUBRICANT CIRCULATOR

Lloyd A. Johnson, Woodside, Dan A. Christensen, Palo Alto, and Antone D. Martin, Menlo Park, Calif., assignors to National Motor Bearing Co., Inc., Redwood City, Calif., a corporation of California Application March 11, 1954, Serial No. 415,468

31 Claims. (Cl. 308—91)

This invention relates to a lubricant circulator and more particularly to a self-contained device adapted to be inserted between the lower side of a journal and the bottom of an oil reservoir adapted to form a housing for the journal. More specifically, the device of the present invention is designed to be driven by the journal and operates to lubricate the journal with certainty and high efficiency over a wide range of conditions and under the most extreme and adverse circumstances.

Although the novel lubricant circulator herein disclosed is of general application to a great variety of journals, a specific application for which it has been found admirably suited is the journals of a rail car truck. Accordingly, the invention will be discussed below in the light of the experience gained in this application in order to illustrate its unique and highly advantageous features.

For decades, railroad cars have been supported on trucks at either end of the car. Each truck comprises two pairs of wheels integral with an axle having journals at its opposite ends projecting from the outer faces of the wheels. The body of the car is supported on these journals through a bolster assembly and bearing brasses. The individual bearing brasses and associated journals are enclosed in a journal housing having an oil reservoir underlying and fully open to the exposed lower half of each journal. It is, of course, imperative that a film of oil be maintained between the journal and the brass bearing resting thereon. Should this film fail for any reason, the metal surfaces in direct contact will quickly abrade and destroy one another. In so doing the heat of friction will not only accelerate destruction of the metals, but may actually ignite the lubricant causing a serious fire.

The problem of providing a satisfactory mode of lubricating rail car journals has received the close attention of designers for more than one hundred years. In general, the solutions proposed may be classified as employing either a mechanical lubricator or a wick-type lubricant feeder. Neither type, as so far developed, begins to cope with the multitude of operating conditions encountered in normal railroad operations. However, the wicking-type lubricator making use of cotton waste to convey oil from the reservoir to the journal has long been favored as more certain in operation despite its many serious disadvantages. Accordingly, the hundreds of thousands of cars now in operation are designed to make use of cotton waste. Hence, one of the primary objectives of the present invention has been the provision of a thoroughly reliable, foolproof mechanical lubricant circulator which can be substituted for the cotton waste in existing equipment without making any alterations in the equipment, as well as a circulator equally well suited for installation in newly designed rail truck equipment. The importance of this adaptability characteristic will be readily appreciated by those skilled in the art who are familiar with the high cost of installing any new accessory requiring even minor changes in existing equipment.

Moreover, the present invention provides a journal lubricator which has met with great success in actual service due to its unique design, remarkable flexibility and versatility, ruggedness, adaptability, light weight, resistance to attack by the elements and lubricating medium, ease of assembly, disassembly and servicing, low maintenance cost, ability to maintain lubrication so long as any oil is present, as well as its ability to maintain the oil temperature much lower than is possible with lubricators heretofore known. Another outstanding characteristic of our lubricator distinguishing it from prior lubricators is its ability to preserve true alignment with the journal despite continuous and abrupt changes in the relative position of the journal and its housing when the car is in transit, together with its ability to absorb shocks, vibrations and abuse generally. This relative movement occurs in every possible direction including axial, radial, angular, and combinations of all three of these. Not to be overlooked as major contributors to the failure of the previous designs are the severe shocks inherent in routine rail operations. These shocks are caused by rough roadbeds, poor rail joints, sudden braking, switching operations, coupling, the negotiation of curves at high speeds, and many other factors, to all of which our lubricant circulator has been found to be highly tolerant while continuing to perform its functions at high efficiency.

Accordingly, a primary object of the present invention is to provide a novel lubricant circulator for journals which is self-contained, rugged, highly flexible, inexpensive to manufacture, install and service, positive and highly efficient in operation and equally suitable for use in either existing or newly designed equipment.

Another object of our invention is the provision of a lubricant circulator which can be quickly installed in existing railway car journal boxes by unskilled labor, and which makes use of resilient portions of the circulator to hold the same in its proper operating position between a journal surface and the bottom wall of the journal housing.

Another object is the provision of a mechanical circulator which automatically maintains itself in true alignment with the journal irrespective of continuing erratic and abrupt changes in the relative positions of the journal and its housing, and irrespective of whether these changes be axial, radial, angular, or some combination of these.

Yet another object is the provision of a lubricant circulator which not only assures positive and complete lubrication of the journal, but which circulates a great excess of oil over the journal and the inner walls of its housing for the purpose of cooling the oil and keeping it at a substantially uniform temperature over a wide range of journal rates of travel. Not only is the cooling capacity in excess of normal requirements (particularly at lower speeds), but the rate of lubricant circulation actually varies as the rate of rotation of the journal varies for the purpose of dissipating the greater heat of friction produced under these conditions.

A further object is the provision of a light-weight lubricant circular designed to embrace the lower, opposite sides of a journal firmly and resiliently, and incorporating moving lubricant conveyors adapted to supply adequate and excess quantities of oil to the journal despite widely varying levels of the lubricant in its reservoir.

Still another object is the provision of a lubricator comprising a readily flexible arcuate main body carrying journal contacting rollers at the outer ends of its arms and wherein each of the rollers' supporting arms is free to flex toward and away from the surface of a journal embraced thereby, as well as to twist about the longitudinal axis of the arms to maintain true rolling contact despite sudden angular displacements of the journal.

Yet another object is the provision of a journal lubricator adapted to be supported between a journal and the bottom of a housing therefore wherein the lubricator is free to pivot bodily about a vertical axis as well as about a point at the lower end of the vertical axis.

Another object is the provision of a lubricator having rollers held in contact with the opposite sides of a journal by spring biased supporting arms supplemented by one or more elastic belts interconnecting the rollers.

A further object is the provision of a lubricant circulator employing resiliently supported oil conveying rollers inter-connected by one or more endless elastic belts having one run in contact with the journal and another run constrained to pass in close proximity to the bottom of an oil reservoir for the purpose of circulating oil to the journal and the surrounding space until the oil supply is substantially exhausted.

Yet another object is the provision of a lubricant circulator making use of one or more endless elastic belts impervious to a lubricant medium and having a small diameter, rounded contour providing a line contact with a journal surface and so arranged that the belts may turn about their own center line as the journal shifts axially.

Numerous other objects and advantages of our invention will become readily apparent from the accompanying detailed specification of an illustrated embodiment of the invention taken in connection with the accompanying drawings, wherein:

Figure 2 is a vertical sectional view through the journal housing showing the lubricating device of Figure 1 installed in operative relation thereto;

Figure 4 is a perspective view looking into the journal box through its entryway showing the lubricating device collapsed or flattened for insertion around the end of the journal;

Figures 6, 7 and 8 are fragmentary diagrammatic views in end elevation, side elevation, and top plan respectively, of the journal, journal housing, and lubricating device showing the relative positions of the various parts for different relative positions of the journal and its housing occurring in the actual operation of the invention.

Figure 1:
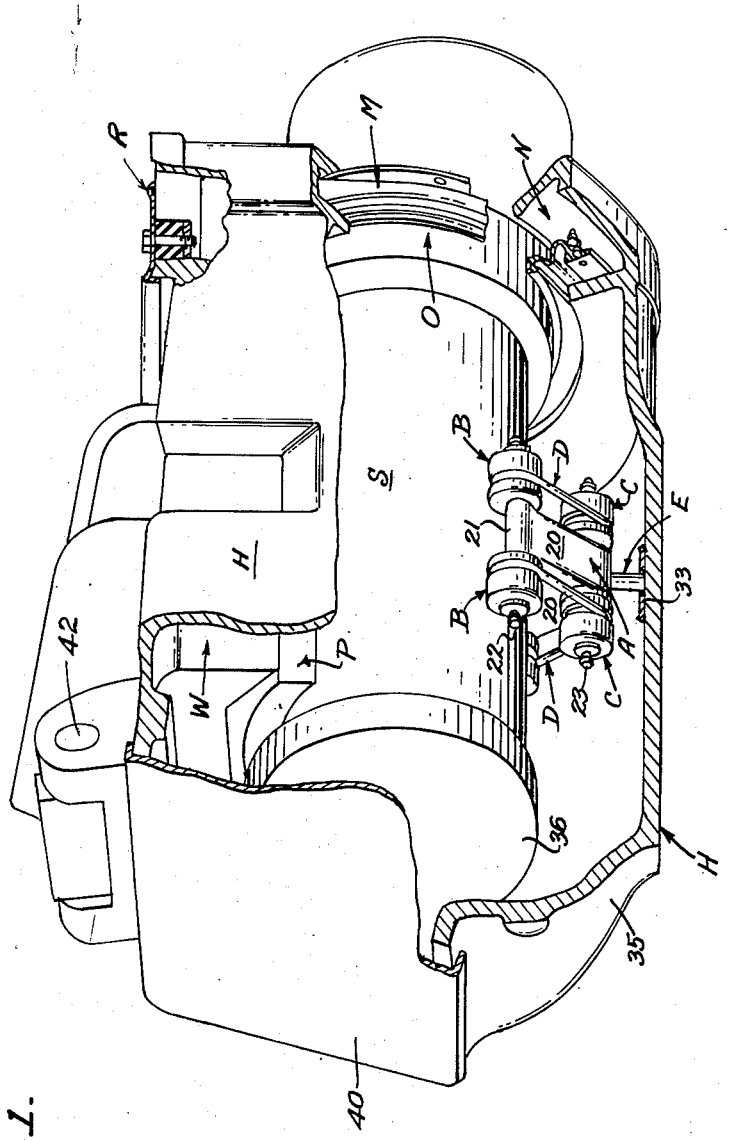
Figure 1 is a perspective view of a lubricating device incorporating the invention as installed in a typical railway journal box with parts of the journal housing broken away.

Figure 1 illustrates a conventional railroad truck journal box H enclosing a journal S and supported thereon through a sandwich consisting of a bearing brass P and a wedge W. Journal S projects trunnion fashion from the outer face of the truck wheel (not shown) and into the housing H through its rear end wall. A rounded sealing shoulder O formed on the journal lies in the plane of the rear end wall of the housing H. Shoulder O forms a seat for the lips of a resilient sealing gasket M of any suitable type carried in a liquid tight manner in an annular channel N opening through the rear top corner of housing H. The open top of channel N is preferably closed by a removable dust cover R.

The upper half of the front end wall 35 of the journal housing is provided with an access opening or entryway 41 lying in a plane inclined to the vertical and normally maintained closed in a liquid tight manner by a cover 40 hinged to the upper wall of housing H as by the usual hinge construction 42. Journal boxes of the type illustrated extend downwardly below the journal sufficiently to form a large capacity oil reservoir which, in current railroad practice, are partially filled with cotton waste in contact with the lower exposed surface of the journal. The present invention teaches the manner in which this cotton waste and the many inherent disadvantages based on its use may be obviated by substituting a mechanical lubricant circulator having the features and unique construction now to be described in detail.

Referring to Figures 1 to 5, it will be seen that the lubricant circulator comprises a main body A formed from either a single or a plurality of closely nested flat leaf springs of U-shape. In comparison with a single leaf spring, a multiple leaf assembly has the advantage of greater flexibility and of withstanding greater bending without taking a permanent set. However, either type of spring assembly is eminently satisfactory. The upper ends of each of the legs of the assembly may be curled around the mid-portion of axles 22 the opposite ends of which project trunnion fashion from either side of the spring assembly. Journaled to each end of the axles is a roller or pulley B which may be held in place in any suitable manner as by split spring keepers 26. Washers 27 are also preferably located on either side of the rollers to protect the rollers and to keep them centered on the trunnions.

A second pair of idler rollers C are supported on an axle 23 carried by a U-shaped clip 24 at the lower bight portion of the main body A. As herein shown, clip 24 is held assembled to the main body A by means of a shouldered pedestal E having a reduced upper end extending through aligned openings in clip 24 and main body A. After a washer 32 has been assembled over the upper end of the pedestal, the projecting portion of the pedestal is beaded or headed over to lock the parts in assembled position. Axle 23 is preferably locked in position in the upstanding legs of clip 24 by keys, upsetting of the metal or any other suitable manner. And of course rollers C may be held assembled to the opposite ends of the axle by split spring keepers.

Figure 5:
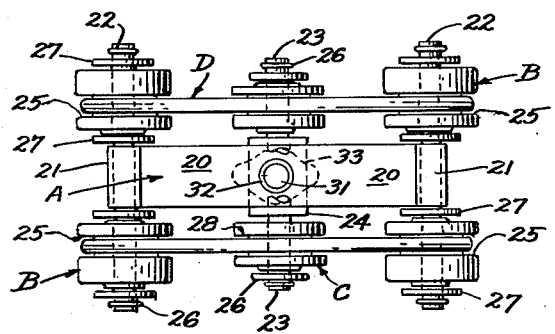
Figure 5 is a top plan view of the lubricator.

As best shown in Figures 2 and 5, each of the rollers is provided with a belt receiving groove 25 for seating an endless elastic belt D of rubber or the like which is impervious to attack by the lubricant with which the device is to be used. The belt grooves 25 are preferably deeper than the diameter of the belts D to avoid any possibility of the belts being pinched by the journal. The grooves are also slightly wider than the diameter of the belt to prevent any binding action and also to permit the belt to roll or turn inside out during axial shifting of the journal with which the lubricator is assembled. If the axis of idler rollers C is located adjacent the bight portion of spring assembly A, it will be apparent that the legs of the spring assembly can flex toward or away from one another through a wide arc without appreciably changing the length of the portions of the belt between rollers B and C; instead, the changes required in the length of the belt by the flexing of the spring are confined to the upper runs of the belt located between upper rollers B.

As made clear by Figures 1 to 5, pedestal E is a short small diameter post having its axis located on the vertical median axis of the lubricator circulator. The lower end of the pedestal is formed to rest directly on the bottom of the oil reservoir which slopes upwardly as it merges with the side walls of journal housing H. Accordingly, it will be clear that the centrally disposed pedestal E cooperates with the shape of the reservoir to maintain the lubricant circulator properly centered beneath the journal, yet allows lubricant circulator to shift or to tilt in any direction about the base of the pedestal as required to maintain the roller axles parallel to the axis of journal S. And of course, as the journal returns to its normal position centrally of housing H, the rounded contour of the reservoir bottom causes the pedestal, if by chance it has become displaced, to return to its position directly beneath the axis of the journal.

Unfortunately, railroad cars are subject to sudden shocks and jolts of such magnitude as to completely or partially displace the circulator. To safeguard against this contingency, it is preferable to provide a guard rail about the base of the pedestal. Such a guard rail may comprise a washer 33, welded or otherwise anchored to the base of the reservoir and having a central opening somewhat larger than the diameter of the pedestal. As a result, the washer acts to prevent displacement of the circulator from its preferred operating position while allowing it to shift or tilt to the extent necessary to maintain the rollers in true rolling contact with the journal surface.

Figures 2 and 4 in particular make clear that the spacing between the flange 36 on the outer end of the journal, and the front wall 35 of the journal housing is very restricted. The lubricant circulator of this invention is specially designed and adapted to be assembled and disassembled as a unit through this restricted space without resort to special tools or the need for partially disassembling any part of the rail truck. Thus, Figure 4 shows the legs 20 of the spring assembly A flattened until rollers B lie substantially in a common plane with idler rollers C. In this collapsed and flattened condition, the circulator can be readily manoeuvered into the entryway 41 of the journal box and downwardly around the flanged end 36 of the journal to its normal operating position directly beneath the journal. Once it has been manoeuvered into place it is allowed to return to its normal shape with the upper rollers positioned on the opposite sides of the journal and in firm contact therewith. Of course, the lower end of the supporting pedestal is seated within guard ring 33 during the assembly operation and either before or after allowing the circulator to expand into embracing contact with the journal.

Should it become necessary for any reason to remove the circulator, it is merely necessary to unseat the pedestal from the guard ring and to flatten or collapse the circulator to the position shown in Figure 4 by grasping rollers B in the operator's hands and deflecting them away from one another toward the horizontal position. While the circulator is so held, it is a simple matter to manipulate it around flange 36 out through the entryway 41.

During either the assembly or disassembly operation, it will be clear that the elastic belts D are held captive in grooves 25 of the rollers. Preferably, the normal relaxed length of the belts corresponds to the length of the belt circuit defined by rollers B and C prior to the assembly of the circulator into the journal box. This normal, fully relaxed position of the circulator is indicated by the dot and dash lines in Figure 3. Hence, it will be clear that as the circulator is assembled in its normal operating position, belts D are placed under light but firm tension.

The belt tension serves a number of important useful functions. First of all, it maintains the belts in firm frictional contact with the bottoms of the roller grooves and thereby provides assurance that rollers B will drive the belts and idler rollers C for a purpose which will be explained more fully presently. The tension on the belt also assures that the upper run will be held in firm, line contact with the under surface of the journal. A particularly important function of the belt tension is to supplement the action of the spring assembly in holding the rollers in continuous and firm contact with the journal to snub any tendency of the rollers, or the circulator as a whole, to vibrate or bounce toward or away from the journal surface. In the absence of this snubbing action, it has been found in practice that vibrations arising from sundry causes result in the corrugation of rollers B, as well as in the journal surface. The highly detrimental effect of this is too obvious for comment. The tension on the belt also assures that the belt will be maintained seated in the roller grooves and prevents it from jumping onto the rim of rollers B where it might be quickly crushed and destroyed by the journal.

Operation

Figure 3:
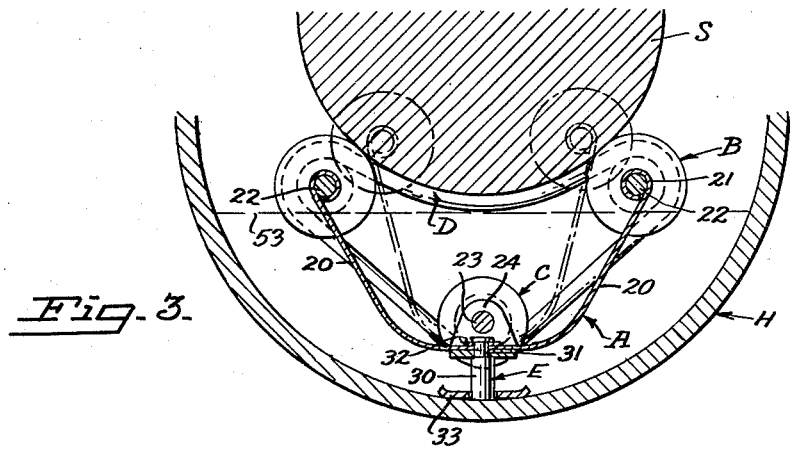
Figure 3 is a vertical sectional view taken along line 3—3 on Figure 2.

Let it be assumed that the lubricant circulator is installed in its normal operating position illustrated in Figure 1. The oil reservoir formed by the lower portion of the journal housing should be filled with a suitable lubricant to a preferred initial level 53 closely adjacent the lowermost portion of flange 36, as illustrated in Figure 3. Under these conditions, the lower runs of the belts are submerged, as are the lower portions of upper rollers B.

As soon as the car is placed in motion, the journal will rotate clockwise or counter-clockwise. However, the direction of travel is immaterial since all parts of the circulator are symmetrical with respect to a vertical plane through the axis of the journal. The opposite legs of the spring assembly, of course, act to maintain rollers B in firm frictional contact with the opposite sides of the journal so that these rollers are driven by the journal. The upper runs of the belts are held in firm line contact with the under surface of the journal by the tension imposed on the belts by the journal. It follows, that the journal drives rollers B which then drive the belts and rollers C.

As the car continues in motion, the rollers, together with the elastic belts, convey large quantities of oil directly to the surface of the journal which then carries the lubricant to the lower surface of the brass P. Due to the very considerable difference in the diameter of the rollers B and the journal, it will be apparent that the rollers operate at a much higher speed than the journal. In consequence, even slow speed movement of the railroad car causes the rollers, as well as the belts, to sling oil from their surfaces by centrifugal action. As the speed of the car increases, this slinging action becomes very pronounced with the result that large quantities of oil are slung forcibly into all parts of the journal housing. An idea of the large quantities of oil maintained in circulation above the oil level by the present design is gained from the fact that when the car is moving at a cruising operating speed the oil level is from one-half to three-quarters of an inch lower than when the car is standing still. In other words, upwards of one quart of oil is maintained in suspension and circulation by the present lubricator under normal operating conditions. This means that all portions of the interior of the housing are flooded in a bath of the circulating oil. Much of the oil is first carried to the journal which then acts as a slinger throwing excess quantities of the oil against the sides and top of the journal housing. Other quantities of oil are flung directly against the interior sides of the housing by the traveling belts and rollers. This circulating oil runs down the sides of the housing in excellent heat exchange relation with the atmospheric air on the outside of the housing.

Since the excess quantity of oil conveyed to the journal and to the interior side walls of the housing is directly related to the speed of the car itself, it will be readily apparent that the rate of oil circulation increases directly with the speed of the car. And of course, the heat of friction caused by the brass and the rotating journal is directly related to the speed of the car. It will therefore be understood why the temperature of the lubricant in reservoirs equipped with the present circulator remains substantially constant over a wide range of car operating speeds. This is highly desirable in order to prolong the life of the lubricant, prevent changes in its viscosity and, of particular importance, it avoids objectionable rises in the vapor pressure within the journal box and thereby safeguards against the escape of oil past seal M or the gasket between the entryway and cover 40.

Let us now consider another highly important aspect and operating characteristic of the present invention. It is well known that wide range relative movements between the journal and its housing take place constantly in the normal operation of rail cars. A rough indication of the magnitude and variety of these relative movements is suggested by the fragmentary diagrams appearing in Figures 6, 7, and 8. For example, the journal and its housing shift through a wide range axially of the journal. The journal also moves up and down in a vertical plane as the car proceeds over a rough roadbed or is jolted in starting, braking, and coupling operations. These operations also result in lateral and angular shiftings of the journal of the general character indicated in Figures 7 and 8.

The present circulator instantaneously accommodates itself to any possible type of relative movement and maintains the rollers in true rolling contact with the surface of the journal under all conditions. For example, the spring assembly A permits the rollers to move toward and away from the journal with great rapidity. Furthermore, the width of springs A, together with their location midway between rollers B, serves to resist any force tending to move axles 22 out of parallelism with the journal.

Likewise, the legs of spring A respond as quickly to torsional movements about the axis of the legs as to flexing movement of the legs toward and away from the side faces of the journal. The significance of this is the fact that the legs of the spring will twist as necessary to maintain the surfaces of rollers B against the journal during any tendency of the journal to shift angularly in the manner indicated in Figure 8. This same result is also assured by another feature of the design; namely, the support of the entire lubricator on the centrally disposed pedestal E. This follows from the fact that the axis of the pedestal coincides with the medial axis of the circulator as a whole, and the fact that the lower end of the pedestal is free to pivot or tilt on the bottom of the oil reservoir. It will therefore be clear that angular relative movements are compensated for either by the twisting of the spring legs, or by the pivoting of the circulator on its pedestal, or by a combination of both of these.

Over a period of many months, the oil level established at the initial filling will have fallen through various causes to a level much closer to the bottom of the reservoir. Certain amounts of the oil are consumed, while other quantities may be lost through vaporization and escape past the seals maintained at the opposite ends of the journal housing. However, the falling oil level does not materially affect the operation of the circulator or the amount of oil maintained in circulation throughout the housing. The fact that the oil level falls below rollers B does not really interfere with their operation as oil circulators, since the lower runs of the belts keep these rollers flooded with excess lubricant and they continue to fling the oil from their rims into contact with the journal as well as with the housing walls.

Eventually, the level falls below the tops of the idler rollers, whereupon they begin to augment the action of the upper rollers in flinging oil upwardly into all parts of the housing. Of course, the continuous jolting of the car truck keeps the oil surging from end to end and from wall to wall of the housing, and tends to keep rollers B bathed in oil, with the net result that upwards of one quart of oil continues in suspension and circulation even after the level has fallen to the level of the axle 23. When this point is reached, it will be appreciated that rollers C maintain the lower run of the belt submerged and close to the very bottom of the reservoir. This fact, together with the continual slushing of the oil along the bottom, keeps rollers C, as well as belts D, supplied with the remaining remnants of the oil supply.

At this point, it is desired to point out several important characteristics of the belt design. Heretofore, it has been considered important when using a belt in a lubricator, to employ a wide belt in contact with substantially the entire lower surface of the journal to assure thorough and complete lubrication. Such belts have serious disadvantages which have been entirely obviated by the present design. Contrary to prior practice, the present device places substantially no reliance upon the frictional contact between the journal and the belt to drive the belt. Instead, adequate frictional contact is maintained between the surface of the rollers and the journal to drive the former, and through them the elastic belts. The latter type of drive has been found much more efficient and positive in action. Moreover, the entire surface of our rounded contour belts acts as a highly effective lubricant pump and circulator, even though only a line contact is maintained between the journal and the upper runs of the belts. This is for the reason that the oil clinging to the entire belt surface as the belt emerges from the pool, gravitates immediately through centrifugal action to the outermost side of the belt from which it is slung upwardly and outwardly with considerable force. The oil slung onto the journal quickly spreads over the length of the journal without either assistance or interference from the belt, in sharp contrast with the mode of operation of the wide belts heretofore used.

Another highly important distinction is that little or no reliance is placed upon wide area surface contact between the belt and the journal for any purpose; on the contrary, a minimum area of contact has been found advantageous. This is largely for the reason that there is constant relative shifting of the journal and the housing. This shifting, and particularly the axial shifting of the journal crosswise of a wide belt, would cause heavy wear on the belt. When the belts of round or elliptical cross-section are used as proposed here, substantially no wear whatever occurs. Axial shifting of the journal with respect to the circulator may result in a turning of the belts about their own axis, thereby bringing a new portion of the belt's surface into contact with the journal. When this occurs, it is not uncommon for the belt to turn 180 degrees or even 360 degrees about its own axis during a single axial shifting movement of the journal.

Among the many other novel and important aspects of the invention is the fact that the present circulator automatically compensates for the wear of the brasses P. For example, when the device is installed in a journal box having thick new brasses, the axis of the journal will be at a considerably lower level with respect to the bottom of the reservoir than when the brasses are substantially worn out. It will therefore be understood that the great flexibility and adaptability of the present circulator enables it to accommodate itself to these changing conditions without changing its mode of operation or its high efficiency. The installation of a new thick brass P merely means that the journal will spread the upper rollers B further away from one another and place the elastic belts D under slightly greater tension. As the brass P wears in use, the springs A, together with the elastic belts D, will provide constant compensation so as to maintain the circulator in firm and proper operating contact with the journal.

At this point, it will also be appreciated that the circulator is composed of a limited number of parts, all of which can be extremely light in weight and yet made from very tough and durable materials capable of withstanding the most brutal, abusive treatment and handling both in use and prior to being placed in use. Because of its very light weight, the device as a whole, as well as its components, has very little inertia which accounts for its rapid response to movement in all directions. It also enables the belts to be highly effective in snubbing any tendency for the lubricator, and especially the upper rollers, to vibrate.

It is also highly advantageous to make the rollers, and particularly the upper rollers, of light weight material having good bearing characteristics, much greater resilience than the journal, abrasion resistance, and which do not become brittle at low temperatures. A satisfactory roller should also have other characteristics, all of which are possessed to a very high degree by certain non-metallic materials such as rubber compounds and certain plastic materials. For example, plastics of the polyamide family are unusually well suited, and one known in the trade as nylon has proven very successful in actual field practice.

To those skilled in the art to which this invention relates, many additional changes in construction and widely differing embodiments and applications of the invention will suggest themselves without departing from the spirit or scope of the invention. For example, it will be apparent that the spring supporting arms for the upper rollers may consist of substantially rigid arms pivotly connected to a central support in the vicinity of or coincident with the axle for idler rollers C. These arms can be biased toward one another in any suitable manner by one or more springs of the tension, compression or torsion variety. While the embodiment illustrated makes use of six rollers and two elastic belts, it will be obvious that the number of rollers may be varied at will between a minimum of two and any desired higher number. And of course a single belt will suffice but fails to provide as much protection as two or more belts or to insure continued lubrication in case of belt failure. Another variation may consist in a different design of the belts and the grooves in which they operate. As pointed out above, belts of round or elliptical contour have been found highly effective in use, but it is to be understood that the invention is not limited to this shape but comprehends a wide variety of cross-sectional shapes including flat, V-shape, rectangular-shape, and many variations of these. The foregoing statements are believed indicative of the fact that the disclosures and descriptions herein are purely illustrative and are not intended to be in any sense limiting.

We claim:

1. A deformable lubricating device adapted to be supported on a lower wall portion of a bearing housing for a rotating journal comprising: a flat spring member having a central portion and upwardly extending arms; upper pulleys rotatably mounted on said arms by means of axles in parallel with one another; lower pulleys rotatably mounted on said central spring portion; endless belt means encircling said pulleys; and pivot means secured to said central spring portion and projecting downwardly therefrom for supporting said device from the lower wall of a bearing housing portion to provide a pivotal support for said lubricating device and permitting the latter to move as necessary to maintain the axles of said pulleys parallel to a journal axis as the journal and its housing assume different positions with respect to each other.

2. The device of claim 1 wherein said endless belt means are elastic and adapted to be maintained under tension when the upper runs thereof are held depressed against the surface of the journal to supplement the action of said spring means in urging said pulleys into effective driving contact with a journal.

3. In combination with a journal assembly having a journal and a bearing housing therefor, a deformable lubricating device supported on a lower wall portion of said bearing housing with its upper end held against said journal comprising: an arcuate spring member having a central portion and upwardly extending spring arms; axles supported on said extending spring arms adjacent and parallel to the surface of said journal; a plurality of pulleys, some mounted on the opposite ends of said axles with their rims in contact with said journal at axially spaced points, and some rotatably mounted on said central spring portion; endless belts encircling the pulleys on the corresponding ends of said axles, respectively, and having their upper runs in contact with said journal over a substantial portion of their length; said belts being held under tension against the lower surface of said journal; and pivot support means secured between the central portion of said spring and the lower wall of said bearing housing to provide pivotal support for said spring member; whereby said spring arms and said tensioned belts mutually cooperate in maintaining certain of said pulleys and the upper runs of said belts resiliently in contact with the lower surface of said journal so that said lubricating device moves freely with the journal as it executes relative movements with respect to the journal housing.

4. A distortable lubricating device designed for insertion as a unit into a bearing housing for a rotating journal comprising an arcuate spring member having terminal spring arm portions, a system of pulleys rotatably mounted on said spring member for rotation about axes in parallel with a journal axis, endless belts encircling said pulleys, a supporting pedestal secured to and projecting downwardly from the central portion of said spring member, said arcuate spring being manually distortable toward a common plane to facilitate assembly of said lubricating device into the oil reservoir of a bearing housing and being operable upon release to assume a lubricating position with the pulleys in contact with a journal to be lubricated and with the supporting pedestal directed downwardly for contact with the lower wall of a bearing housing for a journal.

5. In a bearing housing enclosing a rotating journal, a lubricating device comprising: an arcuate spring member; axles supported at the opposite ends and at the midpoint of said spring member; pulleys rotatably mounted on each of said axles; a plurality of endless belts encircling said pulleys, said end-axle-supported pulleys being adapted to be held in driving contact with said journal from the opposite sides thereof and said midpoint-axle-supported pulleys being adapted to rotate on a lower level from said end-axle-supported pulleys, whereby lubricant below said journals is picked up by said belts and is both thrown and carried directly by the belts from a lower portion of the bearing housing into contact with the rotating journal regardless of the direction of rotation of said shaft.

6. In combination with a journal and a bearing housing therefor, a collapsible lubricating device adapted to be supported on the lower wall portion of said bearing housing, said device comprising: an arcuate spring member having upwardly extending arm portions and pivotal supporting means intermediate said arms for supporting the same from the bottom of said bearing housing, upper pulleys rotatably mounted on said arm portions and urged thereby toward said journal, lower pulleys mounted adjacent the lower ends of said arm portions, endless elastic belt means encircling said pulleys and cooperating with said spring member to hold said upper pulleys in contact with the rotating journal to move therewith and to carry lubricant from adjacent said lower pulley upwardly to said journal, said spring member being collapsible to facilitate installation and removal of the device from between said journal and said housing.

7. In combination with a journal and a housing therefor, a lubricating device comprising: a substantially U-shaped spring member, the extending arms of said member constituting resilient spring arms; driving pulleys rotatably mounted on said spring arms and urged thereby into contact with said journal; idler pulleys rotatably mounted adjacent a lower portion of said spring member; each of said pulleys having annular grooves; endless belts encircling said pulleys and recessed in said grooves; and a supporting pedestal secured to and projecting below the lower portion of said spring member to provide a pivotal point of contact with a lower wall of said bearing housing; whereby the rotating journal imparts rotation to said driving pulleys which in turn move the endless belts to convey lubricant from a lower portion of the bearing housing regardless of relative shifting of said shaft and bearing housing.

8. A unitary, self-aligning lubricator adapted to be vertically collapsed temporarily to a size permitting its insertion beneath a rail car truck journal through the inlet opening of the journal housing, said lubricator comprising the journal housing, a pair of arms having their upper free ends resiliently biased toward one another about their movably joined lower ends, a plurality of parallel axles projecting laterally from the side faces of said arms at the upper and lower ends thereof, belt pulleys on said axles encircled by an endless belt of elastic material resistant to lubricating oil, said belt being stretchable to permit said arms to be moved away from each other as said lubricator is collapsed for insertion through a journal housing inlet, said belt being effective thereafter in cooperation with said resiliently biased arms to hold said lubricator in its operative position in said housing with the upper ends of said arms embracing the opposite sides of a journal and the opposite lower end of the lubricator pivotally bearing on the bottom of the journal housing on a vertical axis extending through the axis of the journal.

9. A unitary, self-contained, self-alignment lubricator adapted to be inserted into and supported on the bottom of a journal housing of the type having an oil reservoir opening upwardly toward the exposed lower surface of a journal enclosed by said housing, said lubricator comprising a journal housing, a single U-shaped spring assembly, each leg of said assembly being readily flexible toward and away from one another and each leg being twistable about a median line extending lengthwise of the leg when a twisting force is applied to the upper end of the legs, means supporting rollers on the upper ends of said legs on axes parallel to one another and at right angles to the plane of said U-shaped spring assembly, and means for supporting said lubricator through the bight portion thereof from the bottom of the journal housing and with said rollers held by said spring assembly in resilient contact with the opposite sides of a journal whereby said rollers are maintained in contact with the journal as the same shifts relative to its housing through any of a great variety of directions.

10. A unitary, self-contained, self-aligning lubricator as defined in claim 9 including an elastic endless belt encircling said rollers and cooperating with the resilient legs of said spring assembly in holding the rollers in contact with the opposite sides of a journal and in snubbing any tendency of the rollers to vibrate or move out of rolling contact with the journal.

11. A unitary, self-contained, self-aligning lubricator as defined in claim 10 including an idler roller for the lower run of said elastic belt, means supporting said idler roller adjacent the lowermost portion of said U-shaped spring assembly so as to constrain said belt to pass in close proximity to the bottom of an oil reservoir on which the lubricator is supported, and the upper run of said belt being adapted to be held depressed by a journal cradled between the rollers on the upper ends of said spring assembly.

12. In combination, a journal housing, a rotating journal extending into the upper portion thereof and overlying an oil reservoir in the lower portion of said housing, a unitary self-aligning lubricator for transferring oil from said reservoir to said journal irrespective of wide variations in the relative positions of said journal and housing when in use, said lubricator comprising a single U-shaped leaf spring assembly having pivot means for supporting the bight portion thereof from a wall of said reservoir and having the free ends of its legs embracing said journal from the opposite sides thereof, roller means carried by the free ends of said spring arms on axes parallel to the axis of said journal with their lower rims in close proximity to an oil pool in said reservoir and their upper rims held in firm resilient rolling contact with said journal surface by said spring irrespective of wide range movements of said housing relative to said journal whereby said rollers are held in substantially true rolling contact with said journal, second roller means supported adjacent said pivot means, and endless belts around said rollers carrying oil from said reservoir up to said journal.

13. In combination, a railroad truck journal housing having an oil reservoir in the lower portion thereof, a wheel journal overlying said oil reservoir and freely exposed thereto, a bearing brass assembly interposed between the upper side of said journal and the top wall of said housing, and self-contained means for lubricating said journal and for circulating large excess quantities of oil into contact with the journal, said bearing assembly and the interior walls of said housing for the purpose of transferring the heat of friction to the exterior ambient air, said self-contained means comprising a unitary assembly interposed between the bottom of said reservoir and the lower surface of said journal and including means for supporting and driving a tensioned elastic belt of small radius from said journal, said belt having one run held in contact with the lower side of said journal and another run passing through the oil in said reservoir and being operable to sling large quantities of oil from its surfaces onto said journal and the interior walls of said housing, and said rotating journal being operable to sling excess quantities of oil supplied thereto onto said brass assembly and the walls of said housing whereby the heat of friction generated between said journal and said brass is transferred to the ambient air by way of said circulating oil and the walls of said journal housing.

14. In combination, a railroad truck journal housing having an oil reservoir in the lower portion thereof and freely exposed to a rotating journal enclosed by the upper portion of said housing, a bearing brass assembly interposed between the top of said housing and the upper side of said journal, and means driven by said journal for lubricating said journal from said oil reservoir and for distributing large excess quantities of oil to all parts of said journal housing in order to transfer the heat of friction to the outside ambient air, said means including a plurality of endless elastic belts of small cross-section, resilient means for supporting said belts under tension and for driving from said journal in accordance with the rate of rotation of said journal and with the lower runs of said belts passing through oil in said reservoir and the upper runs thereof positioned to fling oil by centrifugal action onto said journal and the interior walls of said housing at points spaced axially along said journal, and said journal being operable to fling excess quantities of oil onto the walls of said journal housing whereby the heat of friction is transferred to the outside ambient air by means of said circulating oil.

15. A unitary, self-contained lubricant circulator adapted for mounting between the lower side of a railway truck journal and the bottom of the housing therefor, said lubricant circulator comprising a U-shaped unitary main body formed of resilient flat strip material and having legs, axle means parallel to one another and projecting laterally from the opposite edges of the free ends of said main body, axle means parallel to said first mentioned axle means projecting from the opposite edges of the bight portion of said main body, a pedestal projecting from said bright portion in a direction away from said axles and with its substantially coinciding with an axis passing midway between the legs of said main body, pulleys carried by the free ends of each of said axle means, and resilient belt means encircling the pulleys on either side of said main body and cooperating with said resilient flat strip material in urging the free ends of said main body together in opposition to forces tending to spread the same apart.

16. A unitary, self-contained lubricant circulator as defined in claim 15 wherein the pulleys at the free ends of said main body have a belt receiving groove for said belt means and a relatively wide cylindrical surface to one side thereof adapted to seat against the surface of a railway truck journal and to be driven thereby.

17. A unitary, self-contained lubricant circulator adapted for mounting between the lower side of a railway truck journal and the bottom of the housing therefor, said lubricant circulator comprising a U-shaped unitary main body formed of resilient flat strip material and having legs, axle means parallel to one another and projecting laterally from the opposite edges of the free ends of said main body, axle means parallel to said first mentioned axle means projecting from the opposite edges of the bight portion of said main body, a pedestal projecting from said bight portion in a direction away from said axles and with its axis substantially coinciding with an axis passing midway between the legs of said main body, deeply grooved pulleys carried by the free ends of each of said axle means, and a substantially round resilient belt encircling and seated in the grooves of said pulleys on either side of said main body and cooperating with said resilient flat strip material in urging the free ends of said main body together in opposition to forces tending to spread the same apart, the grooves in said pulleys being at least as deep as the cross-sectional diameter of said belts whereby the rims of said belt grooves are adapted to seat against a railway truck journal without any substantial squeezing of said belts against the bottoms of said belt grooves.

18. A unitary, self-contained lubriacnt circulator adapted for mounting between the lower side of a railway truck journal and the bottom of the housing therefor, said lubricant circulator comprising a U-shaped unitary main body formed of resilient flat strip material and having legs, axle means parallel to one another and projecting laterally from the opposite edges of the free ends of said main body, axle means parallel to said first mentioned axle means projecting from the opposite edges of the bight portion of siad main body, a pedestal projecting from said bight portion in a direction away from said axles and with its axis substantially coinciding with an axis passing midway between the legs of said main body, deeply grooved pulleys carried by the free ends of each of said axle means, and a substantially round resilient belt encircling the pulleys on either side of said main body and cooperating with said resilient flat strip material in urging the free ends of said main body together in opposition to forces tending to spread the same apart, the grooves in said pulleys being sufficiently deep to cooperate with the surface of a railway truck journal and hold the belts captive in said grooves without compressing the belts cross-wise thereof.

19. A unitary, self-aligning lubricant circulator for use in a railway journal assembly to convey oil from a reservoir in the lower portion of the housing and to sling it upwardly against the interior parts of the housing, said lubricant circulator comprising a wide leaf spring assembly of U-shape, pulleys carried on oppositely projecting parallel trunnions secured to the free ends and the bight portion of said U-shaped spring assembly, a resilient non-metallic belt encircling the pulleys on either side of said spring assembly operable to permit but resisting the spreading of the free ends of said U-shaped assembly when a journal is cradled between said free ends, and pedestal means secured to said bight portion and projecting oppositely from the legs of said spring assembly, said pedestal being a one-legged support engageable with the bottom of a railway journal housing for holding the opposite end of the lubricant circulator seated against the under side of a journal.

20. In a railway truck journal assembly of the type having a journal housing provided with an oil reservoir in the bottom thereof, the rear end of said housing having a large diameter opening for the reception of a journal, a truck journal projecting into said housing through said opening, bearing means seated between the top of the journal and the top of said housing adapted to permit wide range movement of the housing relative to the journal; that improvement which comprises a self-contained mechanical lubricant circulator frictionally supported between the lower side of the journal and the bottom of the reservoir and operable to transfer oil from said reservoir upwardly against said journal and throughout the interior of said housing, said circulator having a generally U-shaped frame embracing said journal from the opposite lower sides thereof, belt pulleys carried on the opposite sides of said frame at the bight portion and ends of the legs thereof, resilient oil resistant belts encircling said pulleys at the opposite sides of said frame, and support means projecting downwardly from the bight portion of said frame for supporting said circulator from the bottom of said oil reservoir with the upper runs of said belts held pressed against the lower side of said journal, said support means leaving said U-frame free to open, close, twist and pivot to accommodate the relative movements of said journal and its housing while maintaining the belts in firm driving contact with the journal.

21. In a railway truck journal assembly of the type having a journal housing provided with an oil reservoir in the bottom thereof, the rear end of said housing having a large diameter opening for the reception of a journal, a truck journal projecting into said housing through said opening, bearing means seated between the top of the journal and the top of said housing adapted to permit wide range movement of the housing relative to the journal; that improvement which comprises a self-contained mechanical lubricant circulator supported on the bottom of the oil reservoir and cradled against the lower side of the journal for transferring oil from said reservoir upwardly against said journal and throughout the interior of said housing, said lubricant circulator having a generally U-shaped frame resiliently embracing said journal from the opposite lower sides thereof, belt pulleys carried on the opposite sides of said frame at the bight portion and ends of the legs thereof, resilient oil resistant belts encircling said pulleys at the opoiste sides of said frame for augmenting the resiliency of said U-shaped frame in holding the pulleys at the upper end of said frame in firm engagement with the opposite sides of said journal, and support means projecting downwardly from the bight portion of said frame for supporting said circulator from the bottom of said oil reservoir with the journal cradled against the upper runs of said belts, said support means leaving said U-frame free to open, close, twist and pivot to accommodate the relative movements of said journal and its housing while maintaining the belts in firm driving contact with the journal.

22. In a railway truck journal assembly of the type having a journal housing provided with an oil reservoir in the bottom thereof, the rear end of said housing having a large diameter opening for the reception of a journal, a truck journal projecting into said housing through said opening, bearing means seated between the top of the journal and the top of said housing adapted to permit wide range movement of the housing relative to the journal; that improvement which comprises a self-contained mechanical lubricant circulator adapted to be driven by said journal and operable to circulate large quantities of oil from said reservoir upwardly against said journal and throughout the interior of said housing, said lubricant circulator having a generally U-shaped frame resiliently embracing said journal from the opposite lower sides thereof, at least three belt pulleys carried on the opposite sides of said frame at the bight portion and ends of the legs thereof, resilient oil resistant belts encircling said pulleys at the opposite sides of said frame, and support means projecting downwardly from the bight portion of said frame for supporting said lubricant circulator from the bottom of said oil reservoir with the journal cradled against the upper runs of said belts to tension the same and provide a driving connection between said journal and circulator, said support means leaving said U-frame free to open, close, twist and pivot to accommodate the relative movements of said journal and its housing while maintaining the belts in firm driving contact with the journal.

23. In a railway truck journal assembly of the type having a journal housing provided with an oil reservoir in the bottom thereof, the rear end of said housing having a large diameter opening for the reception of a journal, a truck journal projecting into said housing through said opening, bearing means seated between the top of the journal and the top of said housing adapted to permit wide range movement of the housing relative to the journal; that improvement which comprises a self-contained mechanical lubricant circulator adapted to be driven by said journal and circulate oil from said reservoir upwardly against said journal and throughout the interior of said housing, said lubricant circulator having a generally U-shaped frame resiliently embracing said journal from the opposite lower sides thereof, belt pulleys carried on the opposite sides of said frame at the bight portion and ends of the legs thereof, resilient oil resistant belts encircling said pulleys at the opposite sides of said frame, and support means projecting downwardly from the bight portion of said frame for supporting said lubricant circulator from the bottom of said oil reservoir with the upper runs of said belts held pressed against the lower side of said panel, guard means secured to the bottom of said reservoir for holding said support means loosely in place whereby said U-frame is free to open, close, twist and pivot to accommodate the relative movements of said journal and its housing while maintaining the belts in firm driving contact with the journal.

24. In a railway truck journal assembly of the type having a journal housing supported by bearing means slidable along the top side of a truck journal, said housing having an open oil reservoir in its lower portion and being free to shift, pivot and twist through limited ranges relative to said journal; that improvement which comprises a lubricant circulator resiliently cradled against the lower side of said journal from a support having a limited movement universal connection with the bottom of said oil reservoir, said circulator including a plurality of resilient belts, means for rotatably supporting said belts for operation in spaced apart parallel planes extending transversely of said journal, said belt supporting means including means for holding the lower runs of said belts submerged in oil near the bottom of said reservoir and means for holding the upper runs thereof cradled under tension against the lower side of said journal, the universal connection between said circulator and reservoir being located substantially on the vertical medial axis of said circulator whereby said circulator follows the relative axial, pivotal and twisting movements of said journal and housing instantly to maintain firm and positive driving connection between the journal and circulator.

25. A railway truck journal assembly as defined in claim 24 wherein said belts are susbtantially round in cross-section whereby upon relative axial movement of said journal and housing said journal tends to rotate said belts about their own cross-sectional axis rather than to tilt the circulator away from a vertical plane traversing the journal.

26. A lubricant circulator for use between a railway truck journal and the bottom of the housing therefor, said circulator comprising upwardly diverging arms having their lower converging ends joined together, said arms being resilient and movable toward and away from one another as well as about their own lengthwise axis, axles mounted at the upper ends of each of said arms and at their lower interconnected ends, said axles being parallel to one another and having pulleys mounted on their outer ends at either side of said arms whereby belts can be readily assembled onto or removed from said pulleys without interference from said supporting arms, resilient belts encircling the pulleys on either side of said circulator, and means adapted to support said circulator with its lower end closely spaced above the bottom of an oil reservoir and the pulleys at the upper ends of said arms resiliently embracing the opposite lower sides of a rotating journal.

27. A unitary, self-aligning circulator for use in a journal assembly to convey oil from a reservoir in the lower portion of the housing and to sling it upwardly against the interior parts of the housing; said circulator comprising a wide leaf spring assembly of U-shape, pairs of pulleys carried at the upper ends of the legs and at the bight portion of said U-shaped spring assembly, a plurality of narrow resilient belts encircling said pulleys operable to resist while permitting the spreading of the free ends of said U-shaped assembly when a journal is cradled between said free ends, and pedestal means secured to said bight portion and projecting oppositely from the legs of said spring assembly, said pedestal being adapted to provide a one-legged supported engageable with the bottom of a journal housing for holding the upper runs of said belts held taut against the under side of a journal.

28. A unitary, self-aligning circulator for use in a journal assembly to convey oil from a reservoir in the lower portion of the housing and to sling it upwardly against the interior parts of the housing, said circulator comprising a wide leaf spring assembly of U-shape, pulleys carried at the upper ends of the legs and at the bight portion of said U-shaped spring assembly, a plurality of spaced apart narrow elastic belts encircling said pulleys operable to resist while permitting the spreading of the free ends of said U-shaped assembly when a journal is cradled between said free ends, and pedestal means secured to said bight portion and projecting oppositely from the legs of said spring assembly, the axis of said pedestal being located in a vertical plane passing midway between the outermost ones of said belts.

29. In combination, a housing supported on a rotating journal by a bearing positioned between said journal and said housing, a lubricator for elevating oil from the bottom of said housing into contact with said journal, said lubricator comprising driving pulleys on each side of and in contact with the journal, supporting pulleys spaced below the journal for submergence in said oil, an arcuate spring mount for said pulleys, and resilient taut belt means encircling said pulleys with portions thereof held compressed against the lower portions of said journal so as to be driven by the rotation of the journal, whereby lubricant is carried from a lower portion of the housing upwardly to a bearing surface between said bearing and said rotating journal.

30. In a journal assembly of the type having a journal supporting an enclosing housing and a bearing from the top side thereof; that improvement which comprises a lubricant conveyor for carrying lubricant upwardly from a reservoir in the lower portion of said housing to said journal, said lubricator having a single point of support on the bottom of said housing, an arcuate spring member supported on said support having arms extending on opposite sides of said journal in a plane substantially perpendicular to the axis thereof, first rollers supported on said spring arms and resiliently held in true contact with said rotating journal, second rollers generally parallel to said first rollers supported by said support in said reservoir, and narrow elastic belt means encircling and held under tension by said rollers against the lower surface of said journal, said spring support member and said elastic belt means permitting the rollers to move toward and away from each other and take up new positions of contact on the journal surface as said journal and housing move relatively to one another.

31. A unitary self-aligning lubricator for a journal, housing supported by said journal, a wide leaf spring assembly of U-shape, a pair of rollers mounted on aligned trunnions carried on the free ends of each of the legs of said spring adapted to embrace and firmly contact the surface of a journal from the opposite sides thereof, pivot means projecting outwardly from the lower central bight portion of said spring, a pair of rollers mounted on said pivot means, and belt means encircling aligned rollers, said lubricator being adapted to be inserted between a journal and a wall of its said housing with said pairs of trunnion-supported rollers resiliently held in firm contact with the opposite sides of the journal and with said pivot means resiliently held in supporting contact with an interior wall of the journal housing.

(References on following page)

References Cited in the file of this patent

UNITED STATES PATENTS

| | | |
|---|---|---|
| 801,300 | Conradson | Oct. 10, 1905 |
| 864,778 | Gamage | Sept. 3, 1907 |

FOREIGN PATENTS

| | | |
|---|---|---|
| 314,699 | Germany | Oct. 8, 1912 |
| 400,491 | Germany | Aug. 11, 1924 |
| 412,826 | Germany | Apr. 30, 1925 |
| 421,712 | Great Britain | Dec. 28, 1934 |